United States Patent
Bernard

(10) Patent No.: US 11,198,504 B2
(45) Date of Patent: Dec. 14, 2021

(54) ENERGY ABSORBING LANDING SYSTEMS FOR AIRCRAFT

(71) Applicant: Textron Innovations Inc., Providence, RI (US)

(72) Inventor: Guy Bernard, Kirkland (CA)

(73) Assignee: Textron Innovations Inc., Providence, RI (US)

( * ) Notice: Subject to any disclaimer, the term of this patent is extended or adjusted under 35 U.S.C. 154(b) by 461 days.

(21) Appl. No.: 16/400,002

(22) Filed: Apr. 30, 2019

(65) Prior Publication Data

US 2020/0346743 A1   Nov. 5, 2020

(51) Int. Cl.
*B64C 25/62* (2006.01)
*B64C 29/00* (2006.01)
*B64C 25/32* (2006.01)

(52) U.S. Cl.
CPC .......... *B64C 25/62* (2013.01); *B64C 29/0091* (2013.01); *B64C 2025/325* (2013.01)

(58) Field of Classification Search
CPC ... B64C 25/58; B64C 25/62; B64C 2025/325; F16F 3/04; F16F 7/12; F16F 7/121; F16F 7/122
USPC .......................................................... 267/70
See application file for complete search history.

(56) References Cited

U.S. PATENT DOCUMENTS

| | | | | | |
|---|---|---|---|---|---|
| 1,513,053 | A | * | 10/1924 | Lewis | B64C 25/06 244/104 R |
| 2,182,648 | A | * | 12/1939 | Solomon | B64C 25/62 244/50 |
| 2,444,932 | A | * | 7/1948 | Higgins | B64C 25/30 244/102 R |
| 3,122,345 | A | * | 2/1964 | Thule | B64C 25/62 244/102 R |
| 2015/0041587 | A1 | * | 2/2015 | Schmidt | B64C 25/14 244/102 A |
| 2016/0229516 | A1 | * | 8/2016 | Behrens | B64C 1/18 |
| 2019/0161175 | A1 | * | 5/2019 | Satira | B64C 25/20 |
| 2020/0298964 | A1 | * | 9/2020 | Di Leo | B64C 25/52 |

* cited by examiner

*Primary Examiner* — Richard R. Green
*Assistant Examiner* — Arfan Y. Sinaki
(74) *Attorney, Agent, or Firm* — Lawrence Youst PLLC

(57) ABSTRACT

An energy absorbing landing system for an aircraft having a fuselage includes landing legs rotatably coupled to the fuselage configured to outwardly rotate when receiving a landing load having a magnitude. The energy absorbing landing system also includes an energy absorption unit coupled to the fuselage and cables coupling the energy absorption unit to the landing legs. The energy absorption unit is configured to selectively apply a resistance to the outward rotation of the landing legs via the cables based on the magnitude of the landing load, thereby absorbing the landing load when the aircraft lands.

19 Claims, 10 Drawing Sheets

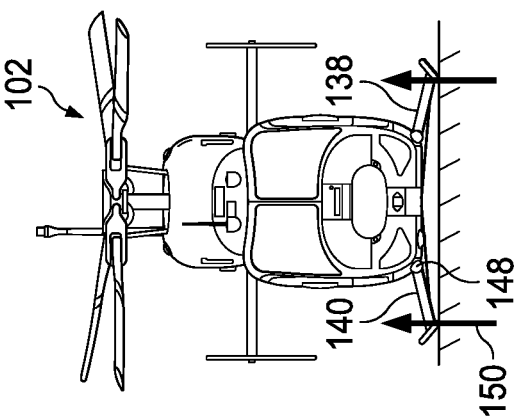
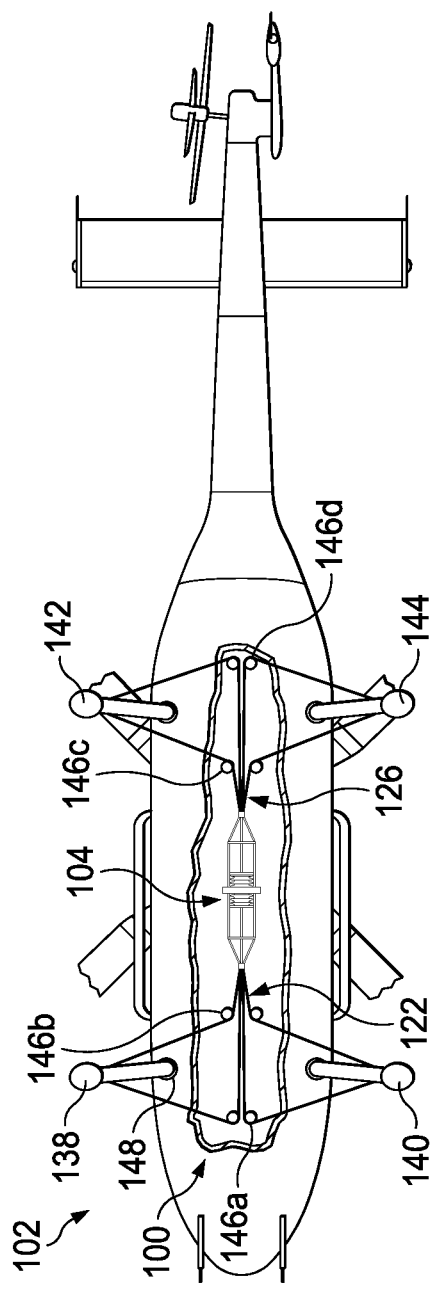
FIG. 2E
FIG. 2F
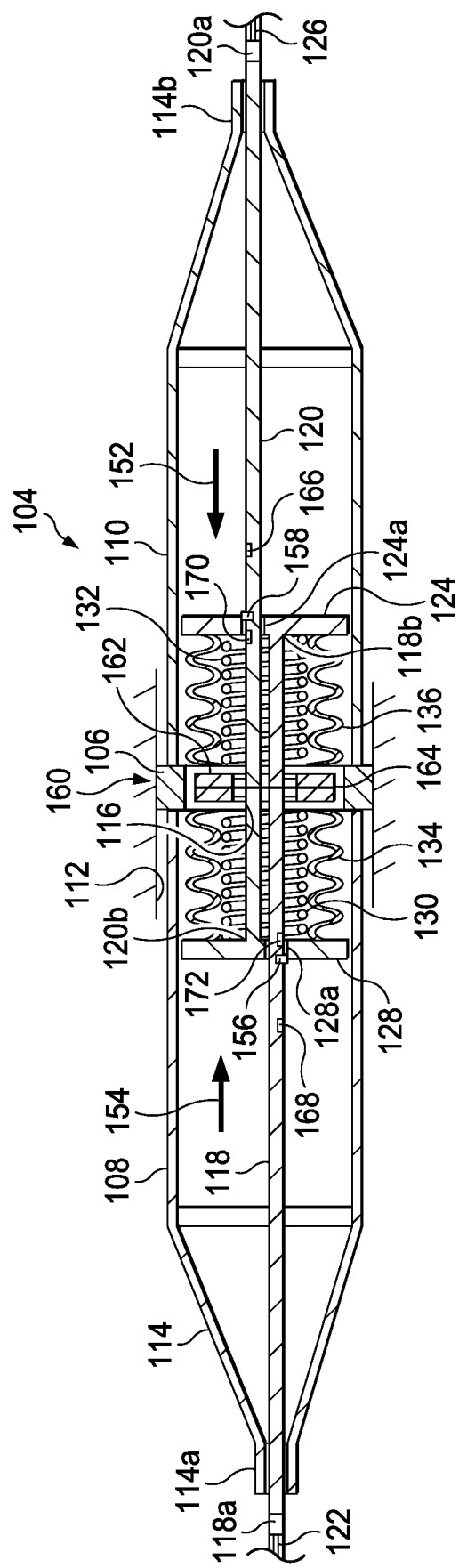
FIG. 2G

ENERGY ABSORBING LANDING SYSTEMS FOR AIRCRAFT

TECHNICAL FIELD OF THE DISCLOSURE

The present disclosure relates, in general, to landing systems for use on aircraft and, in particular, to energy absorbing landing systems having an energy absorption unit configured to absorb the landing load experienced by the aircraft during landing using a selective resistance based on the magnitude of the landing load.

BACKGROUND

Rotorcraft employ different types of landing gear systems based on operational factors including the need to survive hard landings. One common type of landing gear system is a skid landing gear system, which typically includes cross tubes between a pair of skids on which the rotorcraft lands. Traditional helicopter skid landing gear systems rely on plastic deformation of the cross tubes to reduce impact during hard landings. This requires large and stiff cross tubes to withstand hard landings, which introduces weight penalties for the helicopter. Skid landing gear systems also induce high stress loads on the fuselage including tension loads on the fuselage floor and compression loads on the fuselage ceiling. Such stress loads necessitate a stiffer fuselage, incurring an additional weight penalty for the helicopter. Traditional skid landing gear systems also cannot be retracted during flight, thus inducing drag and reducing operational range. Indeed, the geometry and stiffness requirements of skid landing gear systems make them less than ideal candidates for retractable systems.

While many wheel landing gear systems are retractable, wheel landing gear systems, as currently implemented, present other challenges. For example, retractable wheel landing gear systems are expensive to design, test, certify and install, in part because of the extensive airframe modifications they require. Current wheel landing gear systems also require complex, and often heavy, mechanisms that can negatively impact the cost, weight and maintenance requirements of the rotorcraft. Both skid-based and wheel-based landing gear systems can also force the rotorcraft into a hazardous asymmetric roll attitude during a hard landing, which can cause the rotor blades to contact the ground and induce capsizing or other uncontrolled motion. Accordingly, a need has arisen for a rotorcraft landing gear system capable of maintaining a symmetric roll attitude during hard landings while addressing the drawbacks of current skid-based and wheel-based landing gear systems.

SUMMARY

In a first aspect, the present disclosure is directed to an energy absorbing landing system for an aircraft having a fuselage including landing legs rotatably coupled to the fuselage configured to outwardly rotate when receiving a landing load having a magnitude. The energy absorbing landing system also includes an energy absorption unit coupled to the fuselage and cables coupling the energy absorption unit to the landing legs. The energy absorption unit is configured to selectively apply a resistance to the outward rotation of the landing legs via the cables based on the magnitude of the landing load, thereby absorbing the landing load when the aircraft lands.

In some embodiments, the landing legs may include forward landing legs and the cables may include forward cables coupling the forward landing legs to the energy absorption unit. In such embodiments, the landing legs may include aft landing legs and the cables may include aft cables coupling the aft landing legs to the energy absorption unit. In certain embodiments, the energy absorption unit may include forward and aft sections and an anchor wall interposed therebetween. In such embodiments, the forward section may be configured to apply resistance to the outward rotation of the aft landing legs via the aft cables and the aft section may be configured to apply resistance to the outward rotation of the forward landing legs via the forward cables. In some embodiments, the energy absorbing landing system may include a forward cable router subsystem to route the forward cables to the forward landing legs and an aft cable router subsystem to route the aft cables to the aft landing legs. In certain embodiments, the cable router subsystems may each include at least one pulley assembly. In some embodiments, the energy absorbing landing system may include revolute joints each rotatably coupling a respective one of the landing legs to the fuselage. In such embodiments, the revolute joints may each include a torsion spring to outwardly bias the landing legs. In certain embodiments, the energy absorption unit may apply a first resistance to the outward rotation of the landing legs via the cables when the magnitude of the landing load is less than a hard landing threshold. In such embodiments, the energy absorption unit may include a spring to apply the first resistance. In some embodiments, the energy absorption unit may apply a second resistance to the outward rotation of the landing legs via the cables when the magnitude of the landing load exceeds the hard landing threshold. In such embodiments, the second resistance may be greater than the first resistance. In certain embodiments, the energy absorption unit may include a spring and a resistance sleeve to apply the second resistance. In some embodiments, the resistance sleeve may form a substantially cylindrical and corrugated can.

In certain embodiments, the energy absorption unit may include an anchor wall and may be secured to the fuselage via the anchor wall. In some embodiments, the anchor wall may form an aperture and the energy absorption unit may include a tension rod coupled to the cables. In such embodiments, the tension rod may be slidable through the aperture of the anchor wall in response to the landing load. In certain embodiments, the energy absorption unit may include a sensor subsystem to detect a position of the tension rod. In some embodiments, the tension rod may include an end plate and the energy absorption unit may include a mechanical resistor disposed between the end plate and the anchor wall to resist the landing load. In certain embodiments, the mechanical resistor may include a spring and a resistance sleeve. In some embodiments, the energy absorbing landing system may include a landing leg retraction subsystem coupled to the energy absorption unit and configured to inwardly rotate the landing legs into a retracted position beneath the fuselage. In certain embodiments, the energy absorption unit may include a harness operatively coupled to the landing leg retraction subsystem and the cables. In such embodiments, the landing leg retraction subsystem may be configured to translate the harness to pull the landing legs into the retracted position via the cables. The translation of the harness by the landing leg retraction subsystem may translate a tension rod and a mechanical resistor to pull the landing legs into the retracted position via the cables. In certain embodiments, the landing leg retraction subsystem may include a retraction cable operatively coupled to the cables, a retraction spool coupled to the retraction cable and a retraction motor configured to wind the retraction cable around the retraction spool to pull the landing legs into the retracted position via the cables. In some embodiments, the landing leg retraction subsystem may include a deployment handle configured to manually deploy the landing legs from the retracted position.

In a second aspect, the present disclosure is directed to a rotorcraft including a fuselage and landing legs rotatably coupled to the fuselage configured to outwardly rotate when receiving a landing load having a magnitude. The rotorcraft also includes an energy absorption unit coupled to the fuselage and cables coupling the energy absorption unit to the landing legs. The energy absorption unit is configured to selectively apply a resistance to the outward rotation of the landing legs via the cables based on the magnitude of the landing load, thereby absorbing the landing load.

In some embodiments, the rotorcraft may be a helicopter. In certain embodiments, the fuselage may include a subfloor compartment and the energy absorption unit may be disposed in the subfloor compartment of the fuselage. In some embodiments, the energy absorption unit may include an anchor wall coupled to the fuselage airframe, a tension rod coupled to the cables at a first end and having an end plate at a second end and a mechanical resistor between the anchor wall and the end plate to provide selective resistance to the outward rotation of the landing legs based on the magnitude of the landing load.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 2A-2G are various views of an energy absorbing landing system for a rotorcraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
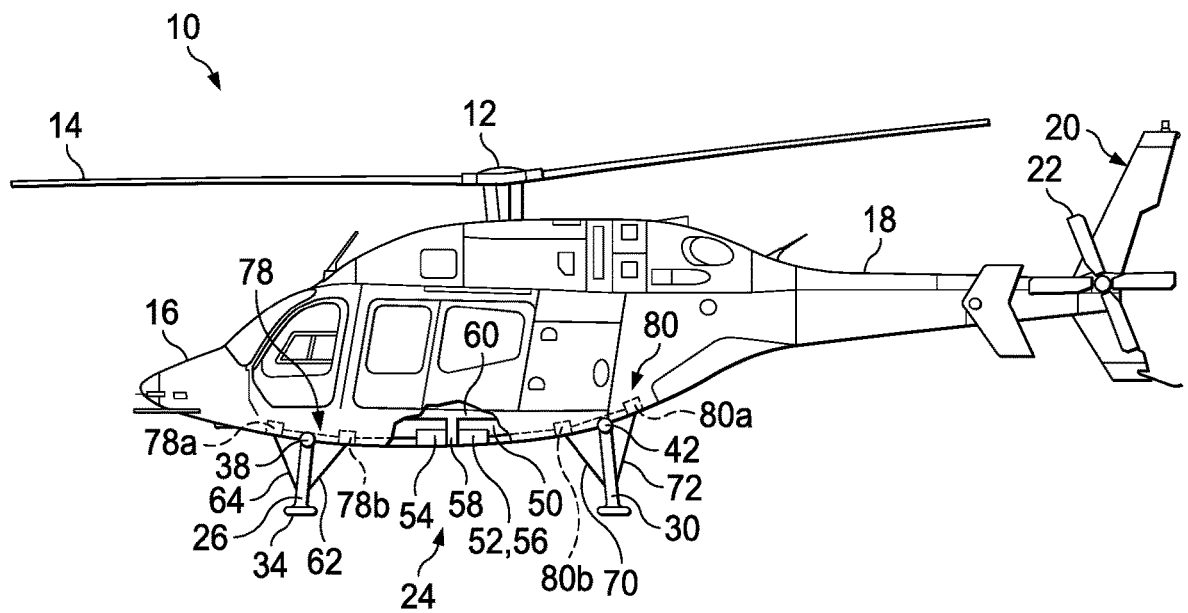
FIGS. 1A-1C are schematic illustrations of a rotorcraft including an energy absorbing landing system in accordance with embodiments of the present disclosure.
Figure 1B:
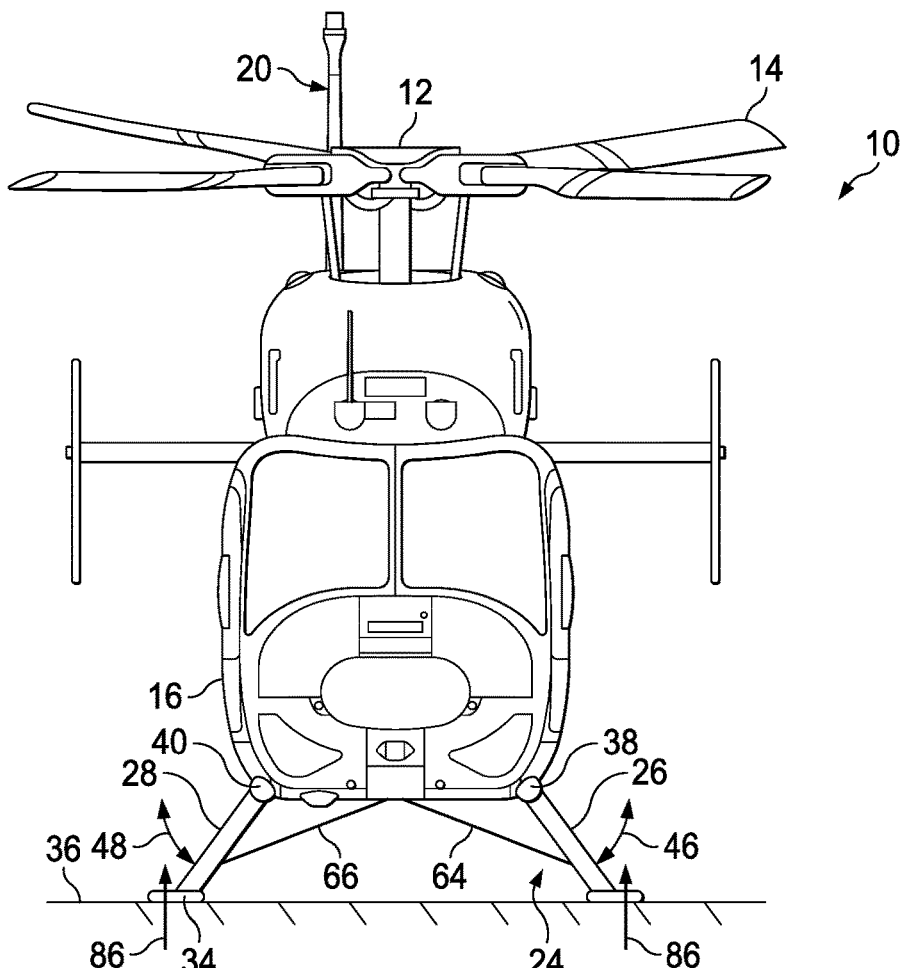
Figure 1C:
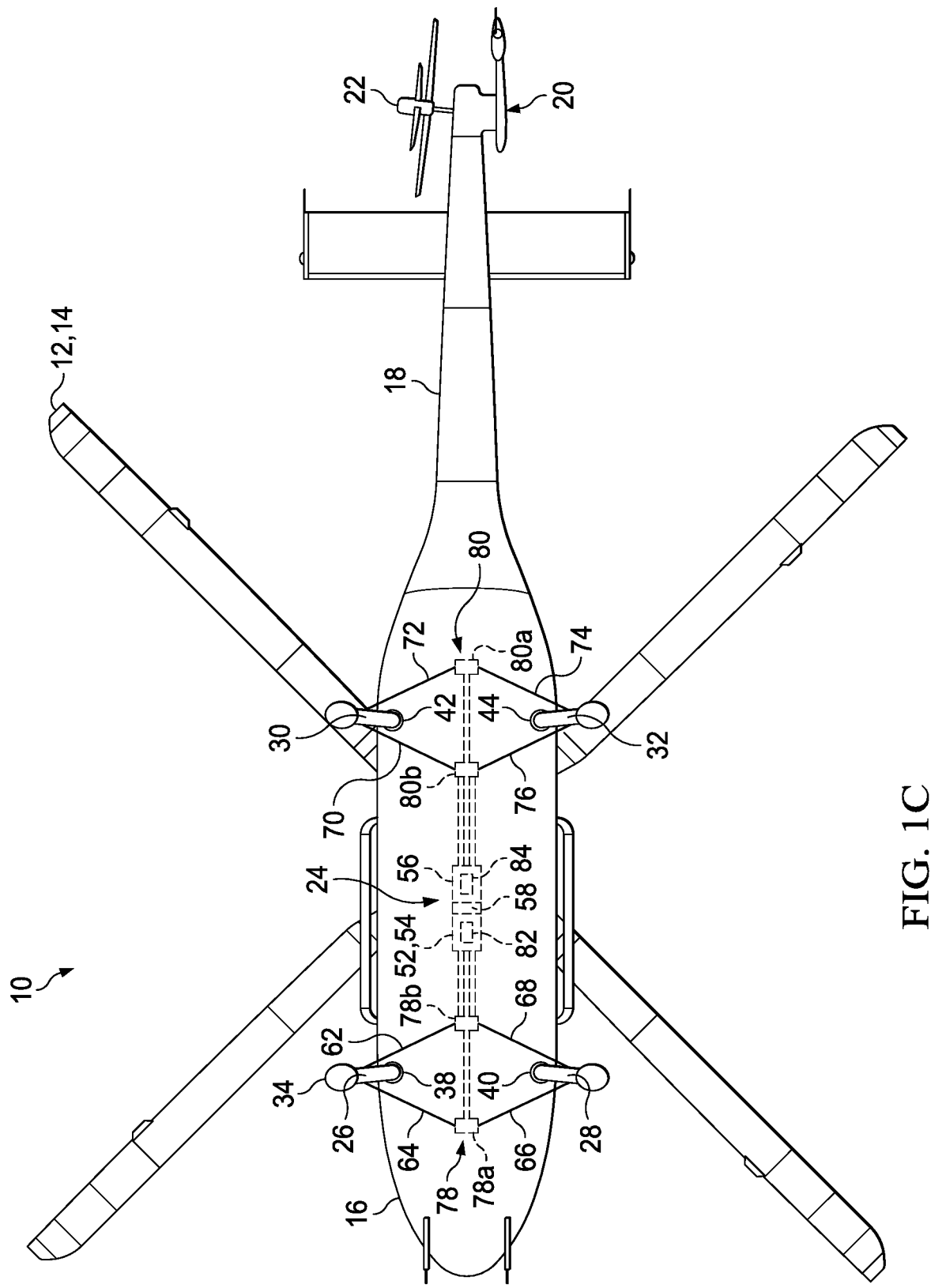

Referring to FIGS. 1A-1C in the drawings, a rotorcraft is schematically illustrated and generally designated 10. In the illustrated embodiment, rotorcraft 10 is depicted as a helicopter having a main rotor 12, which includes a plurality of rotor blade assemblies 14. Main rotor 12 is rotatable relative to a fuselage 16. The pitch of rotor blade assemblies 14 can be collectively and/or cyclically manipulated to selectively control direction, thrust and lift of rotorcraft 10. A tailboom 18 extends from fuselage 16. A tail section 20 includes a tail rotor 22 that is rotatably coupled to the aft portion of tailboom 18. Tail rotor 22 controls the yaw of rotorcraft 10.

Energy absorbing landing system 24 provides ground support for rotorcraft 10. Energy absorbing landing system 24 includes forward landing legs 26, 28 and aft landing legs 30, 32 rotatably coupled to fuselage 16. The distal ends of landing legs 26, 28, 30, 32 include landing feet 34 to facilitate secure contact with a landing surface 36. Landing legs 26, 28, 30, 32 are rotatably coupled to fuselage 16 by revolute, or pivot, joints 38, 40, 42, 44, respectively. Revolute joints 38, 40, 42, 44 permit landing legs 26, 28, 30, 32 to rotate inwardly and outwardly relative to the longitudinal centerline of fuselage 16 as indicated by bidirectional arrows 46, 48. In some embodiments, each revolute joint 38, 40, 42, 44 may include a torsion spring (not shown) or another type of spring to outwardly bias, or rotate, landing legs 26, 28, 30, 32. While energy absorbing landing system 24 is shown as having two forward landing legs 26, 28 and two aft landing legs 30, 32, energy absorbing landing system 24 may include any number of landing legs such as two, three or six landing legs by way of non-limiting example. Furthermore, although landing legs 26, 28, 30, 32 are illustrated as being generally straight, landing legs 26, 28, 30, 32 may be curved, bent or form another shape. Landing legs 26, 28, 30, 32 may have uniform or nonuniform lengths depending on the fuselage geometry and other factors.

Centrally located in subfloor compartment 50 of fuselage 16 is energy absorption unit 52. Energy absorption unit 52 includes a forward section 54 and an aft section 56. An anchor wall 58 is interposed between forward section 54 and aft section 56. Anchor wall 58 is coupled to fuselage airframe 60 to secure energy absorption unit 52 to fuselage 16. Fuselage airframe 60 includes frames, supports, longerons, stringers, bulkheads, skins and other members providing structural support for fuselage 16. In the illustrated embodiment, the top of anchor wall 58 is coupled to a floorboard airframe structure of the passenger cabin and the bottom of anchor wall 58 is coupled to a bottom skin of fuselage 16. In other embodiments, anchor wall 58 may be coupled to other portions of fuselage airframe 60 to provide a structural base for energy absorption unit 52. Energy absorption unit 52 may alternatively be noncentrally located in subfloor compartment 50 such as the forward, aft or lateral portions of subfloor compartment 50. Energy absorption unit 52 may also be located in areas of fuselage 16 other than subfloor compartment 50.

Energy absorbing landing system 24 includes cables 62, 64, 66, 68, 70, 72, 74, 76 coupling energy absorption unit 52 to landing legs 26, 28, 30, 32. Forward cables 62, 64, 66, 68 couple forward landing legs 26, 28 to energy absorption unit 52 and aft cables 70, 72, 74, 76 couple aft landing legs 30, 32 to energy absorption unit 52. Each landing leg 26, 28, 30, 32 is supported by two cables. In particular, forward cables 62, 64 support forward landing leg 26, forward cables 66, 68 support forward landing leg 28, aft cables 70, 72 support aft landing leg 30 and aft cables 74, 76 support aft landing leg 32. Forward and aft cable router subsystems 78, 80 route cables 62, 64, 66, 68, 70, 72, 74, 76 from energy absorption unit 52 to landing legs 26, 28, 30, 32 so that each landing leg 26, 28, 30, 32 is supported on both its forward and aft sides. Cable routers 78a, 78b route forward cables 62, 64, 66, 68 from energy absorption unit 52 to forward landing legs 26, 28. Aft cable routers 80a, 80b route aft cables 70, 72, 74, 76 from energy absorption unit 52 to aft landing legs 30, 32. More particularly, cable router 78a routes forward cables 64, 66 to the forward sides of forward landing legs 26, 28 and cable router 78b routes forward cables 62, 68 to the aft sides of forward landing legs 26, 28. Cable router 80a routes aft cables 72, 74 to the aft sides of aft landing legs 30, 32 and cable router 80b routes aft cables 70, 76 to the forward sides of aft landing legs 30, 32. Routing two cables to each landing leg 26, 28, 30, 32 in this triangulated manner provides stability for each landing leg 26, 28, 30, 32, although in other embodiments each landing leg 26, 28, 30, 32 may be supported by a single cable or by more than two cables. Cable routers 78a, 78b, 80a, 80b are located in subfloor compartment 50 of fuselage 16 in the illustrated embodiment, but may be located elsewhere. In some embodiments, a closed circuit passive or active hydraulic subsystem including cylinders, pistons and/or hydraulic lines may be used to actuate landing legs 26, 28, 30, 32 in addition to or in lieu of cables 62, 64, 66, 68, 70, 72, 74, 76.

Energy absorption unit 52 includes one or more mechanical resistors 82, 84 operatively coupled to cables 62, 64, 66, 68, 70, 72, 74, 76 to resist the outward rotation of landing legs 26, 28, 30, 32. In some embodiments, mechanical resistor 84 in aft section 56 of energy absorption unit 52 applies resistance to the outward rotation of forward landing legs 26, 28 via forward cables 62, 64, 66, 68 while mechanical resistor 82 applies resistance to the outward rotation of aft landing legs 30, 32 via aft cables 70, 72, 74, 76. In other embodiments, however, any number or combination of mechanical resistors may apply resistance to the outward rotation of any one or combination of landing legs 26, 28, 30, 32. For example, mechanical resistor 82 may resist the outward rotation of forward landing legs 26, 28 and mechanical resistor 84 may resist the outward rotation of aft landing legs 30, 32.

FIGS. 1A and 1C illustrate energy absorbing landing system 24 in a deployed position during flight. Landing legs 26, 28, 30, 32 are kept in a neutral, landing-ready deployed position during flight by torsion springs in revolute joints 38, 40, 42, 44, which extend landing legs 26, 28, 30, 32 rotationally outward while energy absorption unit 52 compresses landing legs 26, 28, 30, 32 rotationally inward to counterbalance the rotationally outward force exerted by the torsion springs. Thus, the tension of cables 62, 64, 66, 68, 70, 72, 74, 76 prevents landing legs 26, 28, 30, 32 from overextending outward. In some embodiments, revolute joints 38, 40, 42, 44 may include mechanical stops as a precaution to prevent landing legs 26, 28, 30, 32 from overextending outward into the sides of fuselage 16.

FIG. 1B shows energy absorbing landing system 24 receiving a landing load 86 while rotorcraft 10 lands. Landing load 86 has a magnitude within a normal range for a typical, non-hard landing. Landing load 86 acts on each landing leg 26, 28, 30, 32 to induce tension loads on cables 62, 64, 66, 68, 70, 72, 74, 76 to which mechanical resistors 82, 84 react. In some embodiments, forward section 54 reacts to the landing load on aft landing legs 30, 32 and aft section 56 reacts to the landing load on forward landing legs 26, 28, although in other embodiments this relationship may be reversed. Energy absorption unit 52 is configured to use mechanical resistors 82, 84 to selectively apply resistance to the outward rotation of landing legs 26, 28, 30, 32 via cables 62, 64, 66, 68, 70, 72, 74, 76 based on the magnitude of landing load 86. When landing load 86 has a magnitude within a normal range as illustrated in FIG. 1B, energy absorption unit 52 may apply less resistance to the outward rotation of landing legs 26, 28, 30, 32 than when rotorcraft 10 experiences a hard landing with a landing load that is greater than normal landing load 86. Energy absorption unit 52 is thus capable of adapting to different landing load magnitudes to provide a suitable resistance to the outward rotation of landing legs 26, 28, 30, 32 as required by operational circumstances. In this manner, energy absorption unit 52 dynamically absorbs the landing load and/or vertical kinetic energy experienced by landing legs 26, 28, 30, 32 when rotorcraft 10 lands. Cables 62, 64, 66, 68, 70, 72, 74, 76 are high-strength cables that may be formed from any material capable of withstanding the tensions, loads and stresses experienced during landing.

It should be appreciated that rotorcraft 10 is merely illustrative of a variety of aircraft that can implement the embodiments disclosed herein. Indeed, energy absorbing landing system 24 may be implemented on any aircraft. Other aircraft implementations can include hybrid aircraft, tiltwing aircraft, quad tiltrotor aircraft, unmanned aircraft, multirotor air taxis, gyrocopters, compound helicopters, drones and the like. As such, those skilled in the art will recognize that energy absorbing landing system 24 can be integrated into a variety of aircraft configurations. It should be appreciated that even though aircraft are particularly well-suited to implement the embodiments of the present disclosure, non-aircraft vehicles and devices can also implement the embodiments.

Referring to FIGS. 2A-2G in the drawings, energy absorbing landing system 100 is schematically illustrated for rotorcraft 102. Energy absorption unit 104, best seen in FIGS. 2A, 2D and 2G, includes anchor wall 106 dividing energy absorption unit 104 into forward section 108 and aft section 110. Anchor wall 106 is coupled to airframe 112 of rotorcraft 102. Energy absorption unit 104 includes a harness 114 to house components of energy absorption unit 104 and guide the translational movement of some of the components therein. Anchor wall 106 includes an aperture 116 through which two tension rods 118, 120 are slidable. End 118a of tension rod 118 is coupled to forward cables 122 and end 118b of tension rod 118 includes an end plate 124. End 120a of tension rod 120 is coupled to aft cables 126 and end 120b of tension rod 120 includes end plate 128. End plates 124, 128 include apertures 124a, 128a, respectively. Tension rod 118 is slidable through aperture 128a of end plate 128 and tension rod 120 is slidable through aperture 124a of end plate 124. Tension rods 118, 120 are generally parallel to one another and are slidable, or translatable, along the length of harness 114. Harness 114 guides the translational movement of end plates 124, 128 therethrough to constrain the movement of tension rods 118, 120 along the length of energy absorption unit 104. The forward and aft ends of harness 114 include guides 114a, 114b to guide the translational movement of tension rods 118, 120 and forward and aft cables 122, 126 therethrough, respectively.

Forward and aft sections 108, 110 of energy absorption unit 104 each include two mechanical resistors. Forward section 108 includes compression spring 130 interposed between anchor wall 106 and end plate 128 and aft section 110 includes compression spring 132 interposed between anchor wall 106 and end plate 124. While compression springs 130, 132 are illustrated as coil springs, compression springs 130, 132 may be any type of spring that provides a mechanical resistance between anchor wall 106 and each end plate 124, 128. Compression springs 130, 132 may be formed from any material capable of providing suitable mechanical resistance such as metal, plastic, carbon-based materials as well as other materials. Compression springs 130, 132 are disposed within and parallel to resistance sleeves 134, 136, respectively. Resistance sleeve 134 is disposed in forward section 108 between anchor wall 106 and end plate 128 and resistance sleeve 136 is disposed in aft section 110 between anchor wall 106 and end plate 124. The inner ends of resistance sleeves 134, 136 may rest against or be fastened or adhered to anchor wall 106. Unlike compression springs 130, 132, resistance sleeves 134, 136 extend only a partial distance between anchor wall 106 and end plates 124, 128, thereby exposing portions of compression springs 130, 132. Tension rods 118, 120 are also partially disposed inside resistance sleeves 134, 136 and are slidable therethrough. Each resistance sleeve 134, 136 forms a substantially cylindrical can shape, although resistance sleeves 134, 136 may form other shapes such as polygonal or elliptical conduits. Resistance sleeves 134, 136 may be corrugated as illustrated or smooth and non-corrugated. Resistance sleeves 134, 136 may be deformable, ductile and/or formed and shaped to deform plastically under high compression loads. Resistance sleeves 134, 136 may be manufactured using hydroforming techniques or other manufacturing techniques. In one non-limiting example, resistance sleeves 134, 136 may be formed from a metallic material such as aluminum or steel.

Forward landing legs 138, 140 are supported by forward cables 122 and aft landing legs 142, 144 are supported by aft cables 126 in a similar manner as energy absorbing landing system 24 in FIGS. 1A-1C. Each cable router 146a, 146b, 146c, 146d includes a pulley assembly to route forward cables 122 to forward landing legs 138, 140 and aft cables 126 to aft landing legs 142, 144. Each pulley assembly 146a, 146b, 146c, 146d is illustrated as including two individual pulleys, one for each cable, although in other embodiments each pulley assembly 146a, 146b, 146c, 146d may include one or any other number of individual pulleys. While landing legs 138, 140, 142, 144 are in a deployed, ready-for-landing position during flight, compression spring 132 pushes end plate 124 from anchor wall 106 to pull forward landing legs 138, 140 inwardly via forward landing cables 122. Likewise, compression spring 130 pushes end plate 128 from anchor wall 106 to pull aft landing legs 142, 144 inwardly via aft cables 126. In some embodiments, each revolute joint 148 includes a torsion spring to oppose, or counterbalance, the inward rotation of landing legs 138, 140, 142, 144 by compression springs 130, 132, thus balancing landing legs 138, 140, 142, 144 into the deployed position.

Energy absorption unit 104 utilizes mechanical resistors (compression springs 130, 132 and resistance sleeves 134, 136) to selectively apply resistance to the outward rotation of landing legs 138, 140, 142, 144 via cables 122, 126 based on the magnitude of landing load 150, thereby absorbing landing load 150 when rotorcraft 102 lands. In the normal landing scenario of FIGS. 2B-2D, the magnitude of landing load 150 is less than a hard landing threshold. The hard landing threshold may be defined as a landing load that causes end plates 124, 128 to contact or engage resistance sleeves 134, 136. In the normal landing scenario, energy absorption unit 104 utilizes compression springs 130, 132, but not resistance sleeves 134, 136, to resist the outward rotation of landing legs 138, 140, 142, 144. Landing load 150, acting through landing legs 138, 140, 142, 144 and cables 122, 126, pulls end plates 124, 128 of tension rods 118, 120 toward anchor wall 106. Compression spring 132, by resisting the movement of end plate 124 toward anchor wall 106, resists the outward rotation of forward landing legs 138, 140 and compression spring 130, by resisting the movement of end plate 128 toward anchor wall 106, resists the outward rotation of aft landing legs 142, 144. Compression springs 130, 132 resist end plates 128, 124 from engaging resistance sleeves 134, 136 during normal landing loads. The resistance of compression springs 130, 132 prevent landing legs 138, 140, 142, 144 from overextending outward while smoothly decelerating rotorcraft 102 under normal landing loads. Compression springs 130, 132 thus help facilitate a more comfortable landing for rotorcraft 102.

In FIGS. 2E-2G, rotorcraft 102 is experiencing a hard landing and the magnitude of landing load 150 exceeds the hard landing threshold, as signified by the larger arrows representing landing load 150 in FIG. 2F. Landing load 150 acts on landing legs 138, 140, 142, 144 to induce a tension load on cables 122, 126. The tension load on forward cables 122 is transmitted to aft section 110 of energy absorption unit 104 and the tension load on aft cables 126 is transmitted to forward section 108 of energy absorption unit 104. More particularly, end plate 124 of tension rod 118 moves in direction 152 toward anchor wall 106 in response to landing load 150 on forward landing legs 138, 140 and end plate 128 of tension rod 120 moves towards anchor wall 106 in direction 154 in response to landing load 150 acting on aft landing legs 142, 144. Compression springs 130, 132 have an elasticity that allows end plates 124, 128 to engage the outer ends of resistance sleeves 134, 136 during a hard landing. Thus, when the magnitude of landing load 150 exceeds the hard landing threshold, both compression spring 132 and resistance sleeve 136 provide resistance to the translation of end plate 124 and tension rod 118 in direction 152, thus resisting the outward rotation of forward landing legs 138, 140 while compression spring 130 and resistance sleeve 134 resist the translation of end plate 128 and tension rod 120 in direction 154 to prevent the outward rotation of aft landing legs 142, 144. The combination of compression springs 130, 132 and resistance sleeves 134, 136 provide a greater resistance to the outward rotation of landing legs 138, 140, 142, 144 than is achieved by compression springs 130, 132 alone. As end plates 124, 128 compress resistance sleeves 136, 134, respectively, resistance sleeves 134, 136 deform plastically to absorb a significant portion of the kinetic energy generated during hard landings. Tension rods 118, 120 provide lateral stability as resistance sleeves 134, 136 plastically deform.

The loads experienced by energy absorption unit 104 are reactive to anchor wall 106 attached to airframe 112 for a reduced net load effect on rotorcraft 102 that may be at or near zero since translation directions 152, 154 are opposite one another and centered on anchor wall 106. The resistance exerted by compression springs 130, 132 and resistance sleeves 134, 136 substantially equalize the inward biasing between landing legs 138, 140, 142, 144 so that landing legs 138, 140, 142, 144 extend symmetrically during a hard landing. Since the deformation experienced by energy absorption unit 104 equally affects left landing legs 138, 142 and right landing legs 140, 144, the roll attitude of rotorcraft 102 remains substantially horizontal during hard landings. Hard landings by rotorcraft that have traditional skid landing gear, on the other hand, often result in an asymmetric and nonhorizontal roll attitude which can be hazardous since the main rotor can contact the ground and induce capsizing or other uncontrolled motion. Traditional skid landing gear also causes a tension load in the fuselage floor and a compression load in the fuselage ceiling. By using energy absorbing landing system 100, however, loads transferred to the floor of rotorcraft 102 by cable routers 146a, 146b, 146c, 146d during landing induce a longitudinal compression load that partially reduces the longitudinal tension load that is normally present due to fuselage secondary bending. Cable routers 146a, 146b, 146c, 146d thus introduce a favorable load opposing the tension load to reduce the total load on the floor of rotorcraft 102 as compared to traditional skid landing gear. Rotorcraft 102 thus benefits from less stress on its airframe 112 so that airframe 112 can be designed lighter, thus improving flight efficiency.

Since plastic deformation is limited to resistance sleeves 134, 136, only resistance sleeves 134, 136 require replacement following a hard landing. Although in the illustrated embodiment resistance sleeves 134, 136 plastically deform and are discarded thereafter, in other embodiments resistance sleeves 134, 136 may elastically deform and be reusable. For example, resistance sleeves 134, 136 may be compression springs that are stiffer and/or larger than compression springs 130, 132. In yet other embodiments, resistance sleeves 134, 136 may be omitted from energy absorption unit 104 and selective resistance may be provided solely by compression springs 130, 132.

Tension rod 118 includes shear pin 156 and tension rod 120 includes shear pin 158. Shear pins 156, 158 are designed to fracture when rotorcraft 102 experiences a hard landing. In particular, shear pin 156 is fractured at aperture 116 when end plate 124 engages resistance sleeve 136 and shear pin 158 is fractured at aperture 116 when end plate 128 engages resistance sleeve 134. The fracturing of shear pins 156, 158 indicates to ground crew that maintenance is needed on energy absorption unit 104 and in particular that resistance sleeves 134, 136 should be replaced. Thus, shear pins 156, 158 help to ensure that the structural integrity of resistance sleeves 134, 136 is protected during normal landings such that maximum absorption capability during hard landings is maintained. In other embodiments, such as embodiments in which resistance sleeves 134, 136 are reusable, shear pins 156, 158 may be omitted from energy absorption unit 104.

Figure 2A:
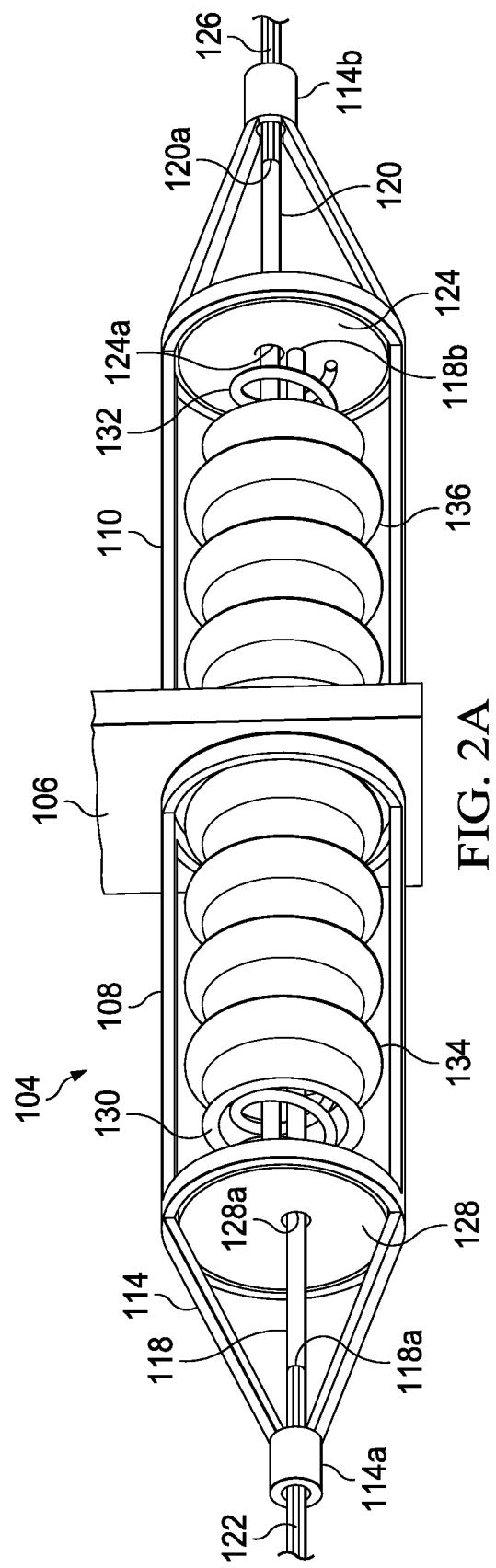
Figure 2C:
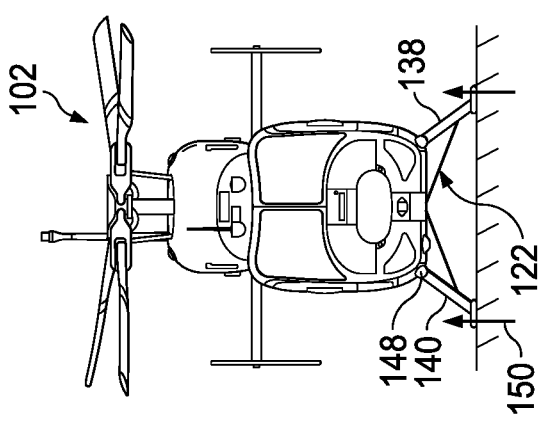
Figure 2B:
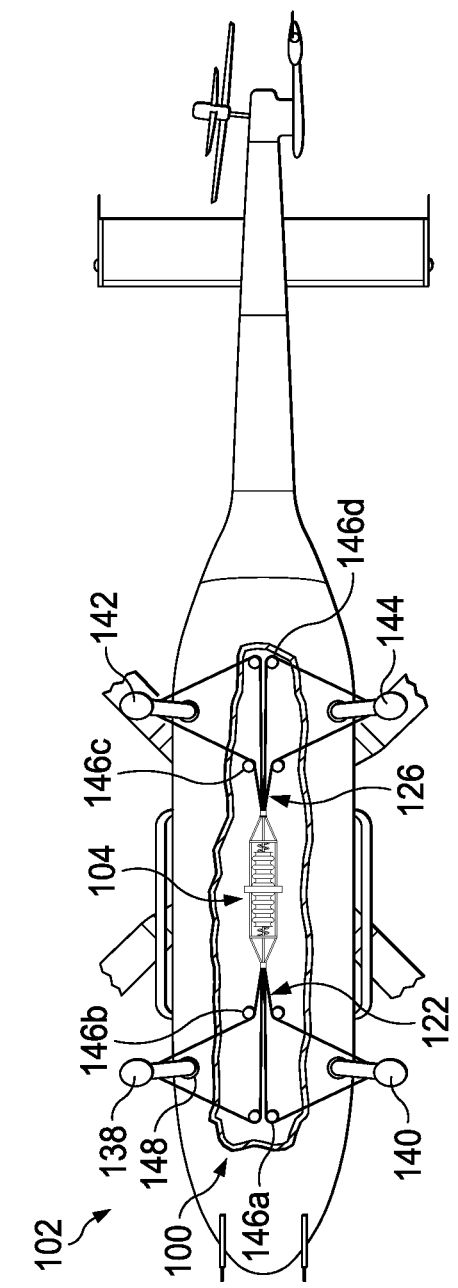
Figure 2D:
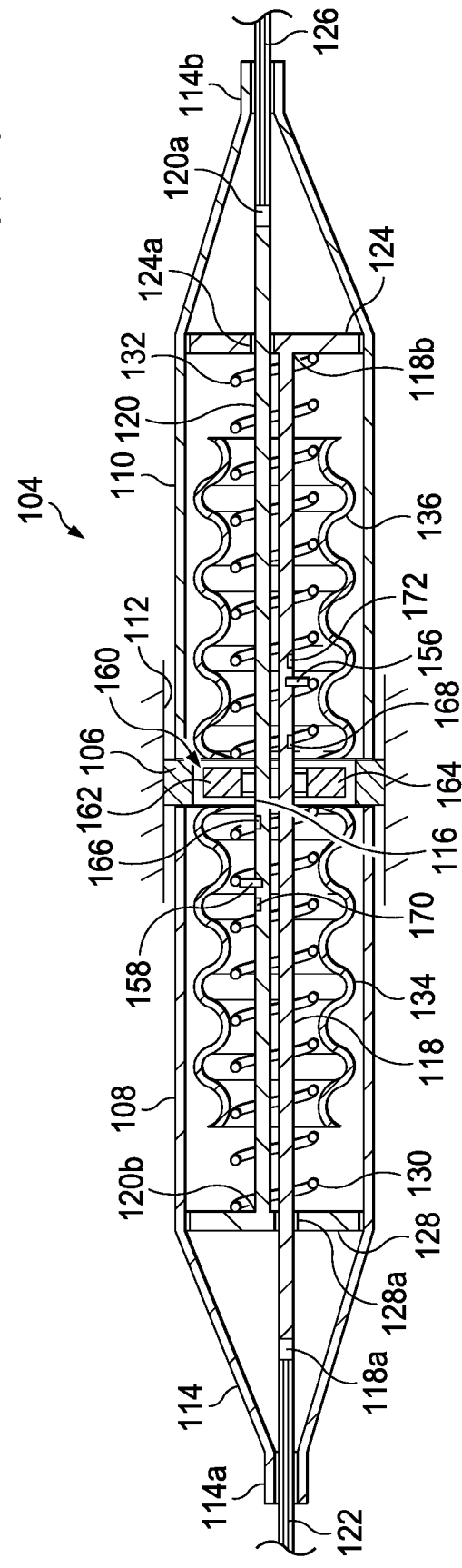

Energy absorption unit 104 includes a sensor subsystem 160 to detect the state of energy absorbing landing system 100. In particular, sensor subsystem 160 employs proximity sensors 162, 164 and proximity targets 166, 168, 170, 172 to detect the translational positions of tension rods 118, 120. When rotorcraft 102 experiences a normal landing and landing load 150 is less than the hard landing threshold as shown in FIGS. 2B-2D, proximity sensors 162, 164 detect normal landing proximity targets 166, 168. A signal may then be sent to a flight control computer or other destination to indicate that a normal landing has taken place. When rotorcraft 102 experiences a hard landing and landing load 150 exceeds the hard landing threshold as shown in FIGS. 2E-2G, proximity sensors 162, 164 detect hard landing proximity targets 170, 172 and a signal may be sent to a flight control computer or other destination to indicate that a hard landing has taken place.

Proximity sensors 162, 164 may be embedded in anchor wall 106 so that proximity sensor 162 may detect normal landing proximity target 166 and hard landing proximity target 170 on tension rod 120 and proximity sensor 164 may detect normal landing proximity target 168 and hard landing proximity target 172 on tension rod 118. In some embodiments, proximity sensors 162, 164 are hall effect sensors that use magnetic flux to detect the direction and number of proximity targets that pass through aperture 116. In such embodiments, proximity targets 166, 168, 170, 172 may be metallic and/or polarized. Proximity sensors 162, 164 may also be optical sensors. In other embodiments, proximity targets 166, 168, 170, 172 may be radio-frequency identification (RFID) targets. Sensor subsystem 160 allows for detection of on-ground and in-flight conditions by detecting the translational positions of tension rods 118, 120 under load. The detection of hard landing proximity targets 170, 172 by proximity sensors 162, 164 may be used to determine when plastic deformation of resistance sleeves 134, 136 has taken place to trigger a corresponding maintenance action to replace resistance sleeves 134, 136. Energy absorbing landing system 100 thus provides numerous benefits including the ability to react and detect normal landing loads and absorb and detect hard landing loads while remaining level to ensure passenger safety. Energy absorbing landing system 100 is lighter in weight than conventional skid-based and wheel-based landing gear designs and reduces or minimizes component replacement following hard landings.

Referring to FIGS. 3A-3F in the drawings, energy absorbing landing system 200 for rotorcraft 202 is schematically illustrated. Energy absorbing landing system 200 includes a landing leg retraction subsystem 204 coupled to energy absorption unit 206 configured to move landing legs 208, 210, 212, 214 between the deployed position shown in FIGS. 3A-3C and the retracted position shown in FIGS. 3D-3F. When energy absorbing landing system 200 is in the deployed position shown in FIGS. 3A-3C, energy absorbing landing system 200 is ready to absorb both normal and hard landing loads 216 in substantially the same manner as that described for energy absorbing landing system 100 in FIGS. 2A-2G. In particular, energy absorbing landing system 200 utilizes energy absorption unit 206 having anchor wall 216, harness 218, compression springs 220, 222, resistance sleeves 224, 226 and tension rods 228, 230 as well as forward and aft cables 232, 234, cable routers 236 and landing legs 208, 210, 212, 214 to selectively apply a resistance to the outward rotation of landing legs 208, 210, 212, 214 based on the magnitude of landing load 216, thereby absorbing landing load 216 when rotorcraft 202 lands.

Figure 3A:
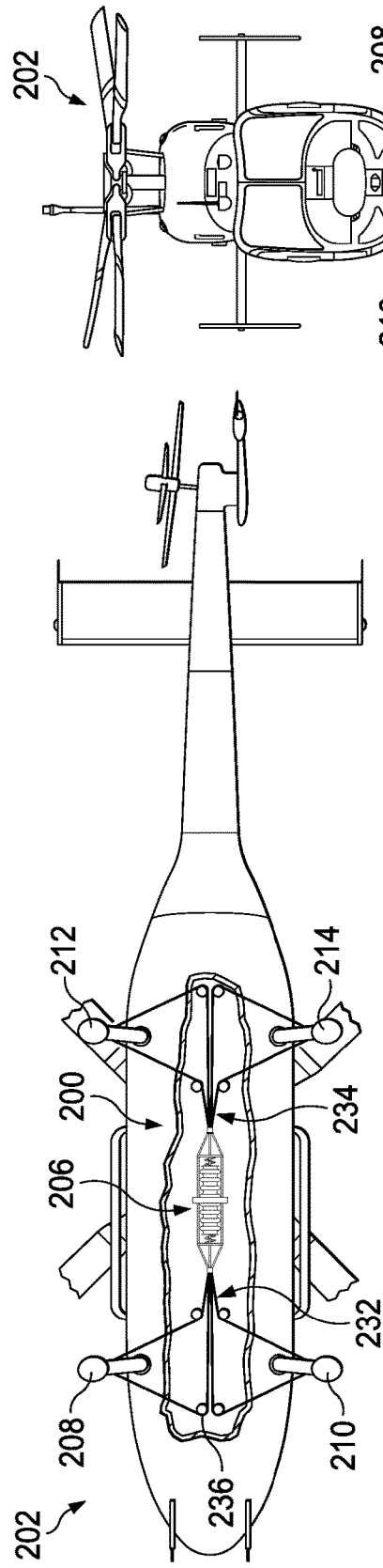
FIGS. 3A-3F are various views of an energy absorbing landing system for a rotorcraft having a landing leg retraction subsystem in accordance with embodiments of the present disclosure.
Figure 3B:
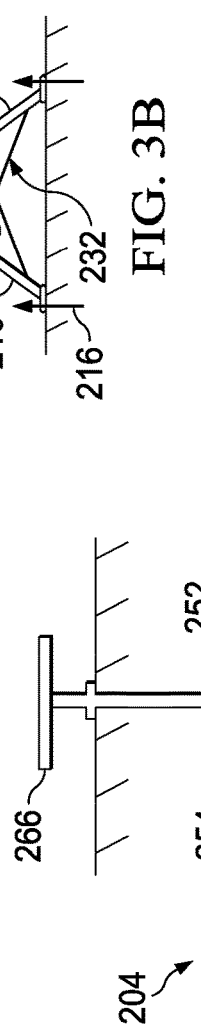
Figure 3C:
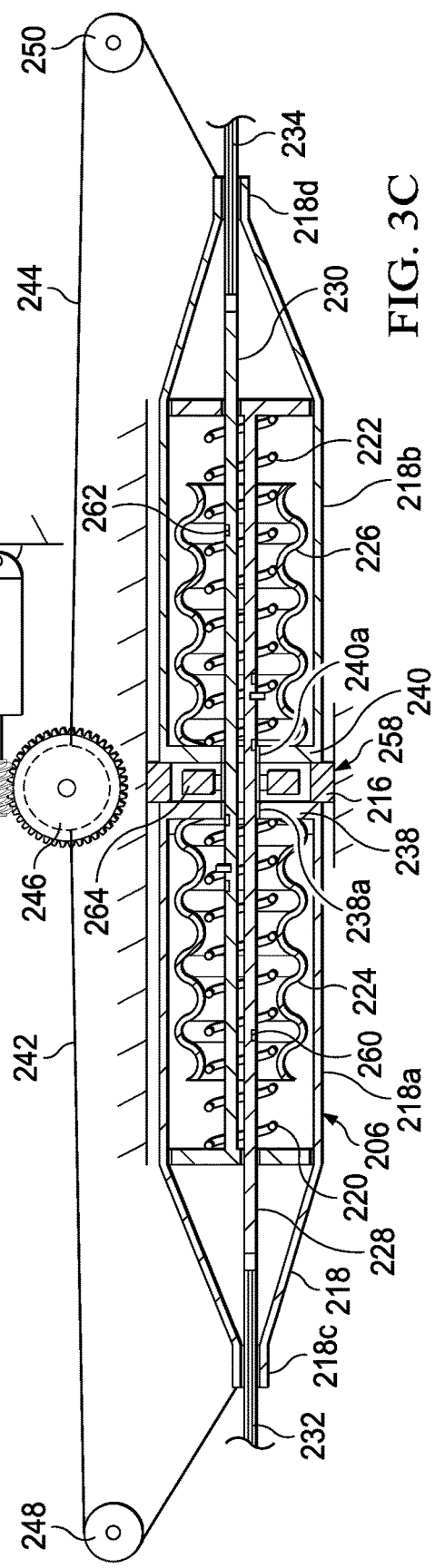
Figure 3E:
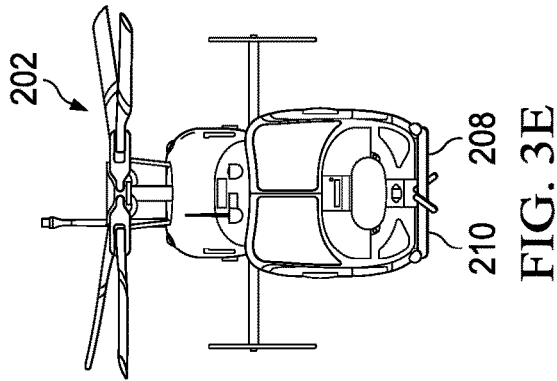
Figure 3D:
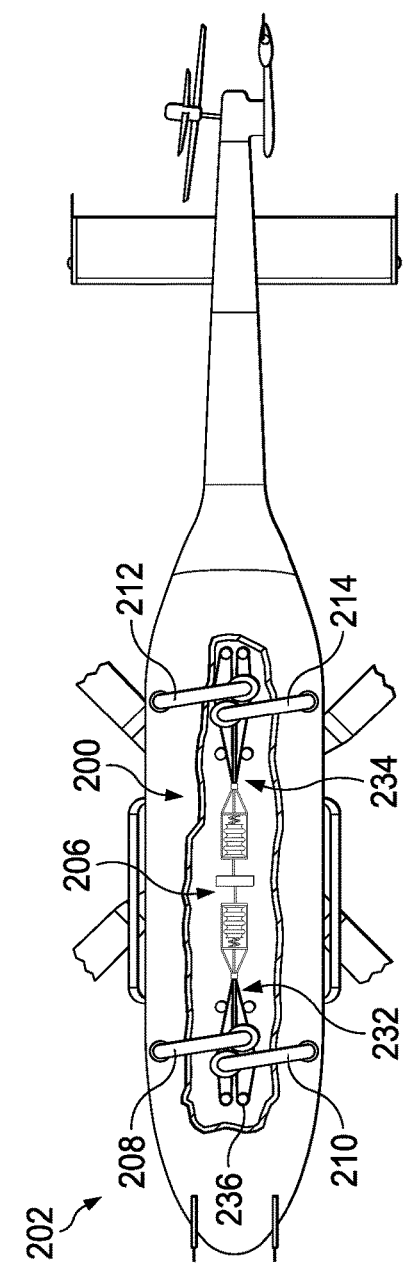
Figure 3F:
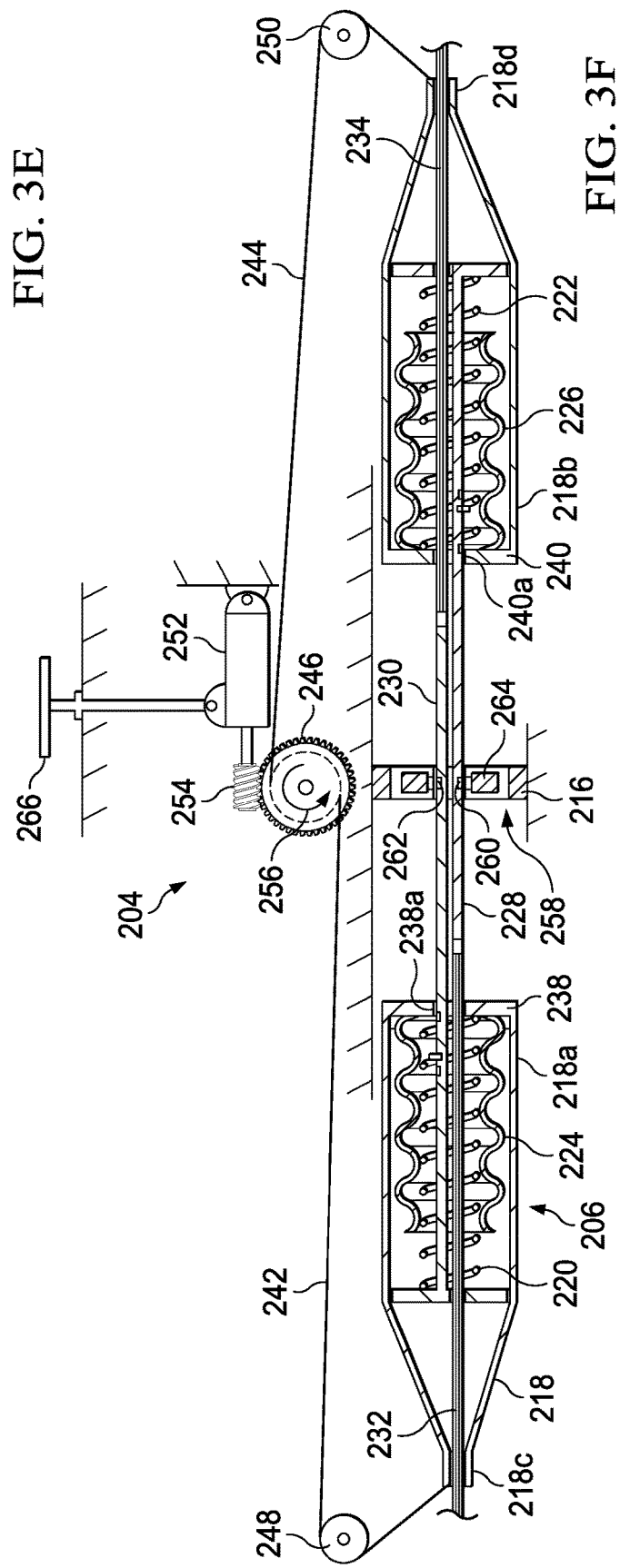

With the addition of landing leg retraction subsystem 204, energy absorbing landing system 200 is configured to inwardly rotate landing legs 208, 210, 212, 214 into a retracted position beneath the fuselage of rotorcraft 202 as shown in FIGS. 3D-3F to provide rotorcraft 202 with the ability to retract or extend its landing gear while airborne. Harness 218 is divided into a forward harness 218a and an aft harness 218b on opposing sides of anchor wall 216.

Forward and aft harnesses 218a, 218b house, or act as a carrier for, compression springs 220, 222, resistance sleeves 224, 226 and the end plates of tension rods 230, 228, respectively. Forward and aft harnesses 218a, 218b are capped at their inner ends by end walls 238, 240, respectively. End walls 238, 240 include apertures 238a, 240a through which tension rods 228, 230 and cables 232, 234 may slide. Forward and aft harnesses 218a, 218b are coupled to landing leg retraction subsystem 204. In the illustrated embodiment, retraction cables 242, 244 are coupled to ends 218c, 218d, or guides, of forward and aft harnesses 218a, 218b, respectively, although in other embodiments retraction cables 242, 244 may be coupled to any portion of forward and aft harnesses 218a, 218b. Retraction cables 242, 244 couple forward and aft harnesses 218a, 218b to a retraction spool 246 via pulleys 248, 250, respectively. Retraction spool 246 is driven by a retraction motor 252 via a worm gear 254. In other embodiments, worm gear 254 may be omitted and retraction motor 252 may directly rotate retraction spool 246. Retraction motor 252 may be a servomotor, stepper motor or any other type of motor. Retraction cable 242 is operatively coupled to aft cables 234 and aft landing legs 212, 214 via forward harness 218a, compression spring 220 and tension rod 230 while retraction cable 244 is operatively coupled to forward cables 232 and forward landing legs 208, 210 via aft harness 218b, compression spring 222 and tension rod 228. In some embodiments, retraction cables 242, 244 may be parallel to tension rods 228, 230 at or around guides 218c, 218d where retraction cables 242, 244 are attached to forward and aft harnesses 218a, 218b. In yet other embodiments, retraction cables 242, 244 may be coupled and disposed within guides 218c, 218d and forward and aft cables 232, 234 may pass outside of guides 218c, 218d.

When energy absorbing landing system 200 transitions to the retracted position, retraction motor 252 rotates retraction spool 246 in direction 256 to wind retraction cables 242, 244 thereabout, thus translating forward and aft harnesses 218a, 218b away from anchor wall 216 and pulling landing legs 208, 210, 212, 214 into the retracted position via cables 232, 234 as shown in FIGS. 3D-3F. More particularly, winding retraction cable 242 around retraction spool 246 in direction 256 translates forward harness 218a, tension rod 230, compression spring 220 and resistance sleeve 224 forward and away from both anchor wall 216 and aft landing legs 212, 214 to inwardly rotate aft landing legs 212, 214 into the retracted position beneath the fuselage. Simultaneously, winding retraction cable 244 around retraction spool 246 in direction 256 translates aft harness 218b, tension rod 228, compression spring 222 and resistance sleeve 226 aftward and away from both anchor wall 216 and forward landing legs 208, 210 to inwardly rotate forward landing legs 208, 210 into the retracted position beneath the fuselage. In this manner, the action of retraction motor 252 causes the simultaneous retraction of all landing legs 208, 210, 212, 214 via cables 232, 234.

In addition to the proximity targets included in sensor subsystem 160 in FIGS. 2A-2G, sensor subsystem 258 additionally includes retraction proximity targets 260, 262 so that proximity sensors 264 may detect when landing legs 208, 210, 212, 214 are retracted. In some embodiments, retraction motor 252 stops when proximity sensors 264 detect retraction proximity targets 260, 262, which signals that the retracted position has been reached. In the retracted position, landing legs 208, 210, 212, 214 may be stowed under the fuselage with sufficient preload using spring compression to prevent motion or vibration of landing legs 208, 210, 212, 214 when rotorcraft 202 flies at high speeds. Sensor subsystem 258 allows energy absorbing landing system 200 to detect an on-ground condition, a hard landing condition, a retracted landing gear condition and a deployed, or extended, landing gear condition, and such condition may be communicated to a flight control computer or elsewhere to facilitate the operation of rotorcraft 202.

Retraction motor 252 may respond to input to extend or retract landing legs 208, 210, 212, 214 from a pilot, operator, flight control computer, remote location or any other source. In emergency or other situations, a deployment handle 266 may be coupled to retraction motor 252 and configured to manually disengage retraction motor 252 from retraction spool 246 to release landing legs 208, 210, 212, 214 from the retracted position and back into the deployed position of FIGS. 3A-3C so that rotorcraft 202 is ready for landing. By way of non-limiting example, in the event that retraction motor 252 fails, deployment handle 266 may be accessed by a crew member or passenger to disconnect worm gear 254 from retraction spool 246 so that landing legs 208, 210, 212, 214, which are spring-loaded in the retracted position, extend outward. In other operational circumstances, the rotation direction of retraction motor 252 may be reversed to rotate retraction spool 246 in a direction opposite from direction 256 to extend landing legs 208, 210, 212, 214 into the deployed position. Energy absorbing landing system 200 thus allows the retraction and extension of landing legs 208, 210, 212, 214 in addition to absorbing normal and hard landing loads. The ability to retract landing legs 208, 210, 212, 214 reduces aerodynamic drag during flight and thus increases the range capabilities of rotorcraft 202. Energy absorbing landing system 200 is able to achieve these benefits in a lightweight and cost-effective manner. In other embodiments, retraction cables 242, 244 may be directly coupled to the inner ends of resistance sleeves 224, 226, respectively. In yet other embodiments, landing leg retraction subsystem 204 may be engaged and disengaged using a clutch.

Figure 4A:
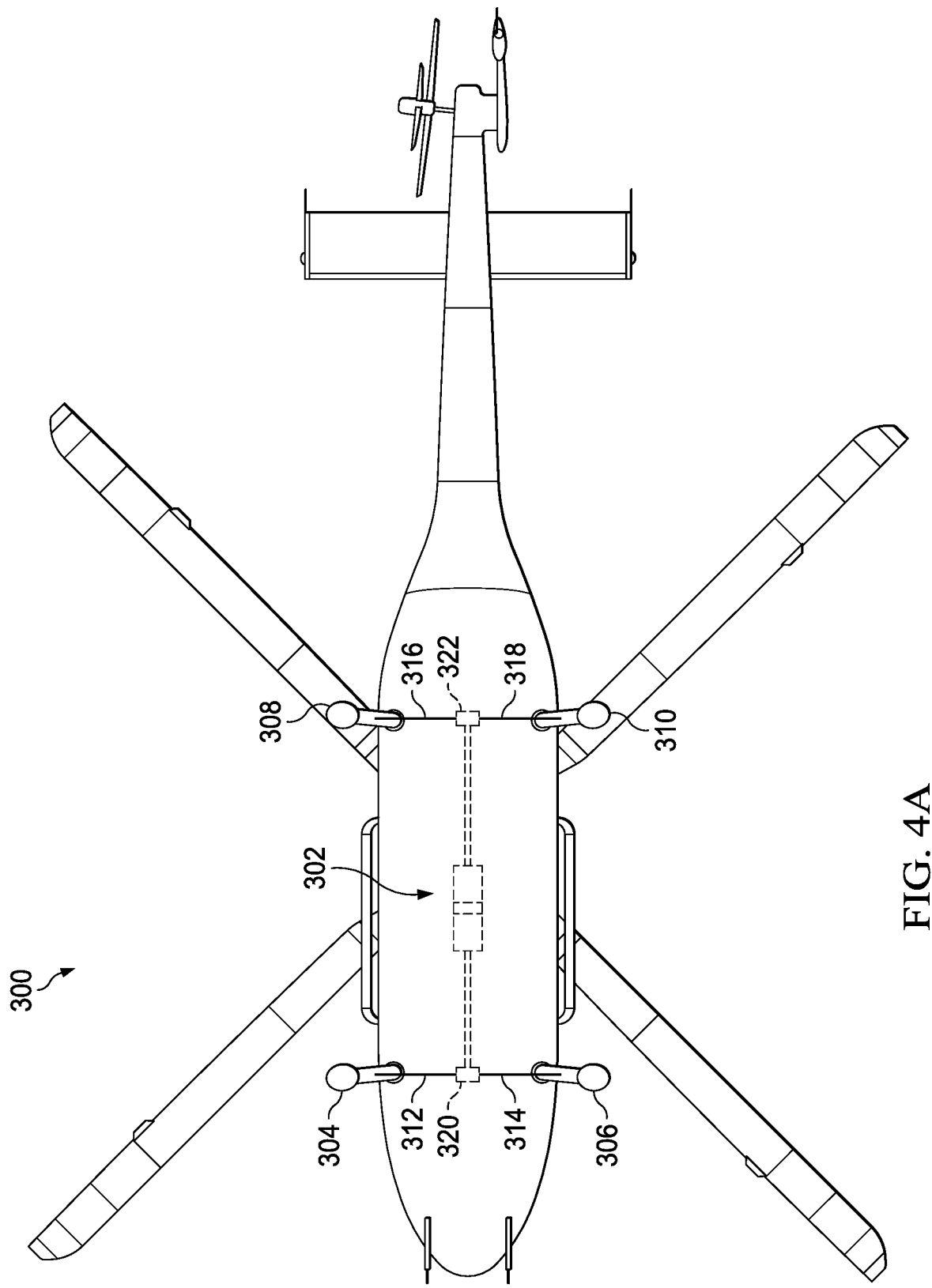
FIGS. 4A-4C are various views of energy absorbing landing systems for different types of rotorcraft in accordance with embodiments of the present disclosure.
Figure 4B:
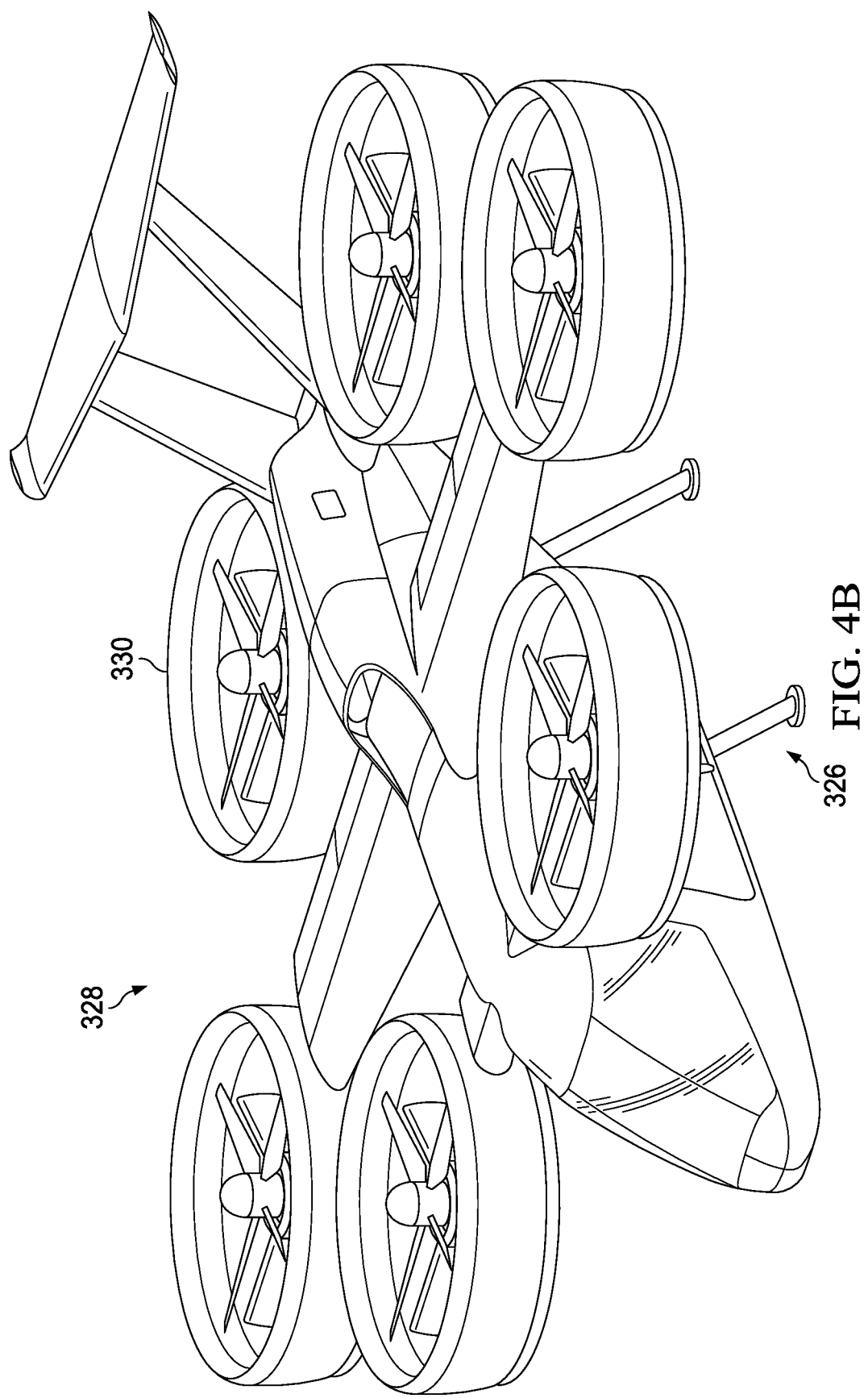
Figure 4C:
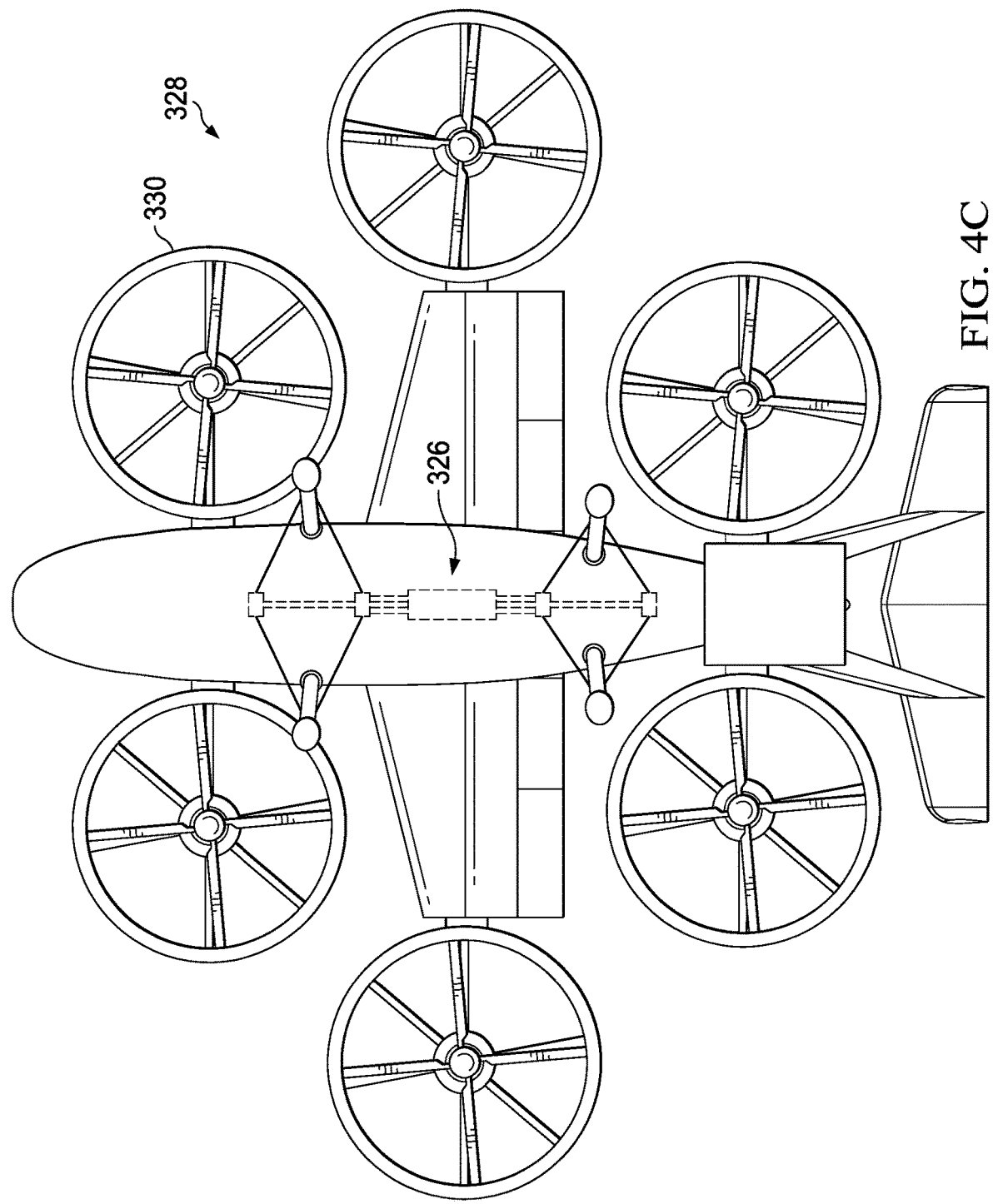

Referring to FIGS. 4A-4C in the drawings, various energy absorbing landing systems are schematically illustrated. In FIG. 4A, rotorcraft 300 utilizes an energy absorbing landing system 302. Each landing leg 304, 306, 308, 310 is supported by a single cable 312, 314, 316, 318, respectively. Energy absorbing landing system 302 utilizes two, instead of four, cable routers 320, 322. Forward cable router 320 routes forward cables 312, 314 to forward landing legs 304, 306, respectively. Likewise, aft cable router 322 routes aft cables 316, 318 to aft landing legs 308, 310, respectively. As demonstrated by energy absorbing landing system 302, various configurations to support landing legs 304, 306, 308, 310 are possible. In FIGS. 4B-4C, energy absorbing landing system 326 is implemented on an air taxi 328. Air taxi 328 may be transitioned between the vertical takeoff and landing mode shown in FIGS. 4B-4C and a forward flight mode in which ducted rotors 330 are rotated into a vertical orientation about a lateral axis. When taking off and landing, air taxi 328 has a strong downward movement component and a small forward movement component. Energy absorbing landing system 326 may be particularly useful when implemented on such vehicles whose landing vectors have a strong vertical component. Nonetheless, the energy absorbing landing systems disclosed herein may be implemented on a wide variety of aircraft.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An energy absorbing landing system for an aircraft having a fuselage, the energy absorbing landing system comprising:
a plurality of landing legs including forward landing legs and aft landing legs, each landing leg rotatably coupled to the fuselage and configured to outwardly rotate when receiving a landing load having a magnitude;
an energy absorption unit coupled to the fuselage; and
a plurality of cables including forward cables and aft cables, the forward cables coupling the energy absorption unit to the forward landing legs, the aft cables coupling the energy absorbing unit to the aft landing legs;
wherein, the energy absorption unit is configured to selectively apply a resistance to the outward rotation of the plurality of landing legs via the plurality of cables based on the magnitude of the landing load, thereby absorbing the landing load when the aircraft lands.

2. The energy absorbing landing system as recited in claim 1 wherein the energy absorption unit further comprises forward and aft sections and an anchor wall interposed therebetween, the forward section configured to apply resistance to the outward rotation of the aft landing legs via the aft cables and the aft section configured to apply resistance to the outward rotation of the forward landing legs via the forward cables.

3. The energy absorbing landing system as recited in claim 1 further comprising a forward cable router subsystem to route the forward cables to the forward landing legs and an aft cable router subsystem to route the aft cables to the aft landing legs.

4. The energy absorbing landing system as recited in claim 1 further comprising a plurality of revolute joints, each revolute joint rotatably coupling a respective one of the plurality of landing legs to the fuselage.

5. The energy absorbing landing system as recited in claim 1 wherein the energy absorption unit applies a first resistance to the outward rotation of the plurality of landing legs via the plurality of cables when the magnitude of the landing load is less than a hard landing threshold.

6. The energy absorbing landing system as recited in claim 5 wherein the energy absorption unit further comprises a spring to apply the first resistance.

7. The energy absorbing landing system as recited in claim 5 wherein the energy absorption unit applies a second resistance to the outward rotation of the plurality of landing legs via the plurality of cables when the magnitude of the landing load exceeds the hard landing threshold, the second resistance greater than the first resistance.

8. The energy absorbing landing system as recited in claim 7 wherein the energy absorption unit further comprises a spring and a resistance sleeve to apply the second resistance.

9. The energy absorbing landing system as recited in claim 1 wherein the energy absorption unit further comprises an anchor wall, the energy absorption unit secured to the fuselage via the anchor wall.

10. The energy absorbing landing system as recited in claim 9 wherein the anchor wall forms an aperture and the energy absorption unit further comprises a tension rod coupled to the plurality of cables, the tension rod slidable through the aperture of the anchor wall in response to the landing load.

11. The energy absorbing landing system as recited in claim 10 wherein the energy absorption unit further comprises a sensor subsystem to detect a position of the tension rod.

12. The energy absorbing landing system as recited in claim 1 further comprising a landing leg retraction subsystem coupled to the energy absorption unit and configured to inwardly rotate the plurality of landing legs into a retracted position beneath the fuselage.

13. The energy absorbing landing system as recited in claim 12 wherein the energy absorption unit further comprises a harness operatively coupled to the landing leg retraction subsystem and the plurality of cables, the landing leg retraction subsystem configured to translate the harness to pull the plurality of landing legs into the retracted position via the plurality of cables.

14. The energy absorbing landing system as recited in claim 12 wherein the landing leg retraction subsystem further comprises:
a retraction cable operatively coupled to the plurality of cables;
a retraction spool coupled to the retraction cable; and
a retraction motor configured to wind the retraction cable around the retraction spool to pull the plurality of landing legs into the retracted position via the plurality of cables.

15. The energy absorbing landing system as recited in claim 12 wherein the landing leg retraction subsystem further comprises a deployment handle configured to manually deploy the plurality of landing legs from the retracted position.

16. A rotorcraft comprising:
a fuselage;
a plurality of landing legs including forward landing legs and aft landing legs, each landing leg rotatably coupled to the fuselage and configured to outwardly rotate when receiving a landing load having a magnitude;
an energy absorption unit coupled to the fuselage; and
a plurality of cables including forward cables and aft cables, the forward cables coupling the energy absorption unit to the forward landing legs, the aft cables coupling the energy absorbing unit to the aft landing legs;
wherein, the energy absorption unit is configured to selectively apply a resistance to the outward rotation of the plurality of landing legs via the plurality of cables based on the magnitude of the landing load, thereby absorbing the landing load.

17. The rotorcraft as recited in claim 16 wherein the rotorcraft further comprises a helicopter.

18. The rotorcraft as recited in claim 16 wherein the fuselage further comprises a subfloor compartment, the energy absorption unit disposed in the subfloor compartment of the fuselage.

19. The rotorcraft as recited in claim 16 wherein the fuselage further comprises an airframe and the energy absorption unit further comprises:
- an anchor wall coupled to the airframe;
- a tension rod coupled to the plurality of cables at a first end and having an end plate at a second end; and
- a mechanical resistor between the anchor wall and the end plate to provide selective resistance to the outward rotation of the plurality of landing legs based on the magnitude of the landing load.

* * * * *